United States Patent Office 3,403,734
Patented Oct. 1, 1968

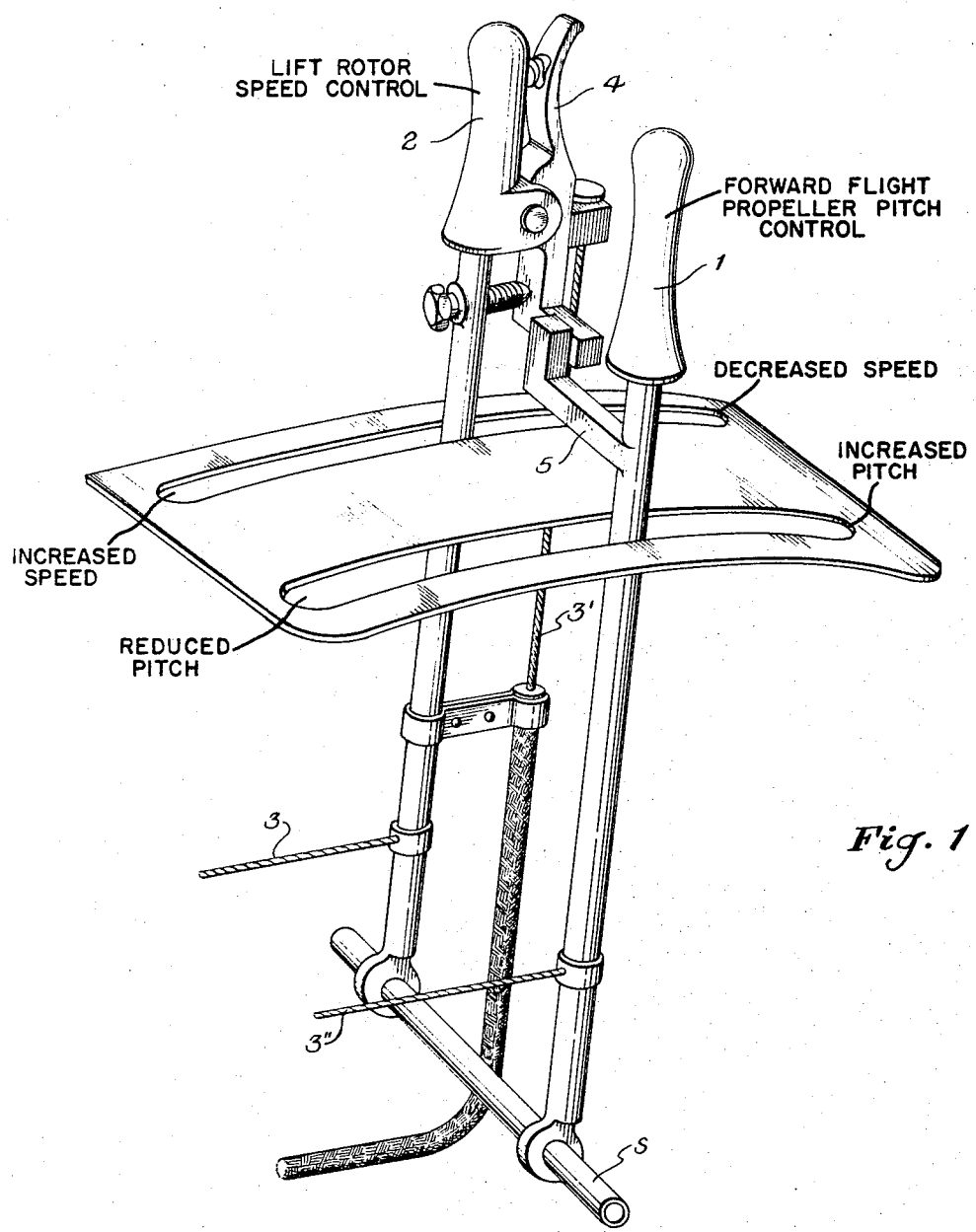

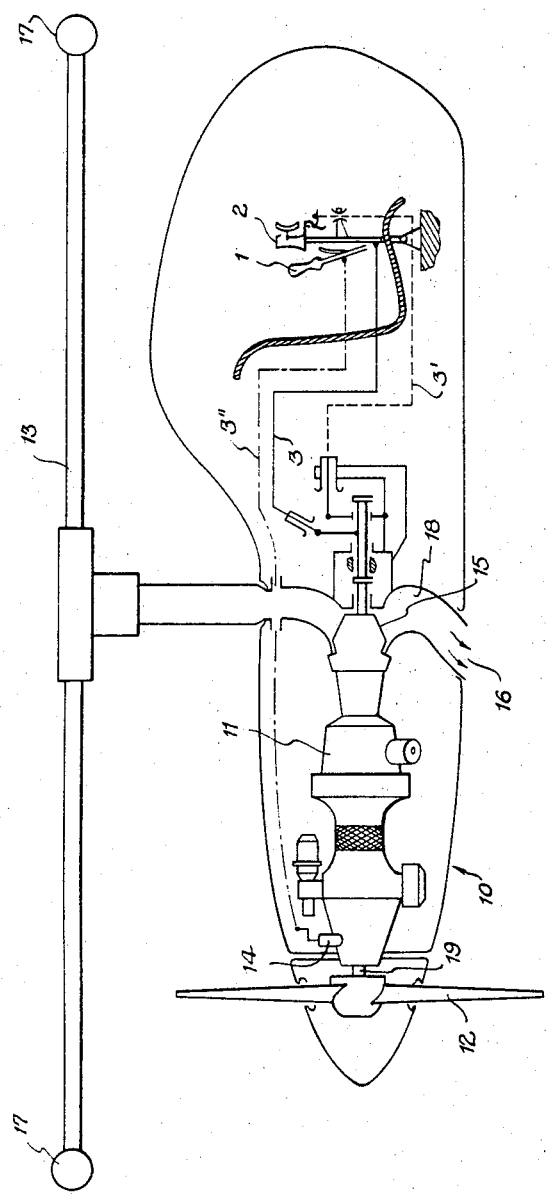

3,403,734
CONTROL MEANS FOR ROTARY WING AIRCRAFT
Bruno Herrmann, Pahl, Upper Bavaria, Germany, assignor to M.A.N. Turbo G.m.b.H., Munich-Allach, Germany
Filed June 20, 1966, Ser. No. 558,877
Claims priority, application Germany, June 24, 1965, B 82,541
2 Claims. (Cl. 170—135.74)

ABSTRACT OF THE DISCLOSURE

A helicopter is powered by a gas turbine. The exhaust gases from the turbine drive the rotor blade for vertical lift. The turbine shaft drives a variable pitch propeller for forward flight. The throttle controls for the rotor blade and the propeller are engageable with each other so that when the propeller speed is increased the turbine exhaust gases are always diverted from the rotor blade and are discharged into the atmosphere. This prevents the overloading of the turbine during the transition from vertical to forward flight.

---

This invention relates to a control means for rotary wing aircraft and in particular for a helicopter having a vertical lifting rotor wing driven by gases produced by a gas turbine and an adjustable propeller directly driven by the gas turbine shaft. The rotary wing has thrust nozzles which are supplied with recycled turbine exhaust waste gases in order to drive the rotor wing during vertical lift or hovering. The propeller is angularly adjusted for forward flight.

Such an aircraft customarily has a common power unit, such as a gas turbine, for supplying the rotor wing drive and the propeller drive. Such has the danger that the power unit may be overloaded either because of faulty servicing or operation. This is most possible when the aircraft is being changed from hovering into forward flight. In order to drive the rotor wing with compressed waste exhaust gas from the gas turbine, this gas must be at a certain above atmospheric pressure in passing through and leaving the thrust nozzles. The excess pressure in the exhaust gas system for the turbine thus represents a load on the turbine which can become so large that the turbine is being used solely for producing the compressed exhaust gas. To do so, the turbine is loaded to full thermal capacity and runs at maximum speed. This takes place, for example, in creating the power for vertical takeoff or for hovering of the aircraft. However, the turbine shaft is directly connected with the adjustable propeller and therefore the propeller is consuming power even though it is being rotated at low pitch. As the aircraft is changed over from vertical or hovering flight to forward flight, the pilot has to gradually increase the load on the propeller, that is to increase the pitch and thus the thrust of the propeller. Danger arises at this point if the pilot does not simultaneously reduce the load on the turbine for vertical lifting and, in an extreme case, the power takeoff of the exhaust gas used to drive the rotor wing together with the shaft power for the propeller overloads the turbine. At this time, a control element is supposed to operate to reduce the turbine speed or even stop the turbine with the result that the aircraft falls and will crash if auto-rotation of the rotor wing does not occur in due time.

The object of this invention is to produce a control means which will prevent such an incorrect and faulty pilot operation. In accordance with this invention, means are provided on the turbine engine controls so that the waste gas power supplied to the rotor wing is decreased when the propeller speed is being increased.

The advantages of this invention are largely due to the fact that the control means is obtained without a large construction expense while at the same time it makes it impossible to overload the turbine which could lead to the crash of the aircraft. In this invention, for each position of the control means for the recycling of the turbine waste exhaust gases, there is only one optimum position of the control lever for changing the propeller pitch and thus the overloading of the turbine and danger to the aircraft is avoided.

Another advantage of this invention is in that, during changeover from hovering to forward flight, the pilot needs to operate but one control lever so that at this critical time the pilot is using one hand and has the other hand free for any other desired operation.

The means by which the objects of the invention are obtained are described more fully with reference to the accompanying schematic drawings in which:

FIGURE 1 is a perspective view of the control means of this invention; and

FIGURE 2 is a cross-sectional view through the aircraft.

In the control of an aircraft such as has been described in which the turbine shaft drives the propeller and the exhaust waste gas of the turbine is used to drive the rotary wing, there are provided for a constant engine speed a first propeller angle or pitch control lever 1 and a second recycled waste gas control lever 2 which is connected by way of a rotary slide valve for recycling waste gas to the rotary wing thrust nozzles. These levers 1 and 2 are mounted in parallel planes and independently pivotally supported on a shaft S so that they can be moved parallel to each other. They are connected by rods or cables 3 and 3' to corresponding valves or gears.

As shown in FIGURE 2, the helicopter 10 has a gas turbine 11 which drives a variable pitch propeller 12 by means of a shaft 19. The variable pitch propeller is controlled by lever 1 through line 3" and gearing 14. Rotor blade 13 is driven by the exhaust gases from the turbine, the gases being emitted from the tips of the blades through nozzles 17. A slide valve 15 is turnable so that the gases are either sent to the rotor 13 or are exhausted into the atmosphere through the pipe 18 and orifice 16. The valve is actuated by the lever 2 through the control line or cable 3. This action can be supplemented by manipulation of the line 3' through hand lever latch 4.

The pitch of the propeller 12 is increased by movement of the lever 1 to the right in FIGURE 1. This increases the propeller thrust and thus the forward aircraft speed for horizontal flight. In a reverse movement of lever 1 to the left, the propeller pitch is decreased and the aircraft velocity slowed.

The waste gas lever 2 has mounted thereon a hand lever latch 4 which is connected by a cable 3' to shift rotary slide valve 15 from its seat in order to be able to rotate it. After latch 4 has moved either to the right or to the left to turn valve 15. When moved to the left, the waste gases from turbine 11 are directed through the nozzles 17 in rotary wing 13 so that the rotor provides vertical lift. During movement to the right, valve 15 is turned so that the waste gases are discharged without pressure into the atmosphere and thus the rotary wing is not driven.

According to this invention, an arm 5 is secured to propeller pitch control lever 1. Thus when lever 1 is moved to the right, arm 5 is moved to the right, arm 5 engages hand lever latch 4 and moves latch 4 so as to shift valve 15. Further movement of lever 1 causes lever 2 to be moved parallel with lever 1. This rotates rotary slide valve 15 to discharge the waste gas into the atmosphere.

The effect of the operation of this invention is as follows.

It is assumed that levers 1 and 2 in FIGURE 1 have been moved from the position shown, entirely to the right which is the final position to give full power to propeller 12 for forward flight. That is, with the largest propeller pitch, the aircraft has the greatest forward thrust while at the same time the turbine exhaust waste gases are discharged into the atmosphere without back pressure, and thus the rotary wing 13 is not being driven by nozzles 17. Lever 1 can now be moved to the left to the final left position without moving lever 2 and thereby changing the pitch of propeller 12 according to the desired speed of flight. If, at this point, a changeover is to be made from horizontal to hovering or vertical flight, then it is only necessary to move the lever 2 from the full right position to the full left position which causes arm 5 to be engaged and lever 1 pulled along. The result is that automatically for each position of lever 2 there is obtained a parallel displacement of lever 1 and thus the optimum permissible and possible pitch of the propeller blade. At the same time, the flow of the waste gases to nozzles 17 on rotary wing 13 is automatically obtained while the propeller pitch and the load on turbine shaft 19 is being lessened so that the turbine cannot become overloaded.

If, on the other hand, a changeover is being made from hovering or vertical flight, then it is only necessary to move lever 1 to the right so that arm 5 automatically actuates hand lever latch 4 to shift rotary slide valve 15 and the lever 2 is carried along and the flow of the waste gas to nozzles 17 stopped. Again, in this case, no overload on the turbine is possible because, as the turbine shaft load is increased, the waste gas pressure is decreased.

Having now described the means by which the objects of the invention are obtained, I claim:

1. In a rotary wing aircraft comprising rotor means for providing vertical lift, variable pitch propeller means for forward flight, a gas turbine, valve controlled means between said turbine and said rotor means for driving said rotor means by the turbine exhaust gases, turbine shaft means connecting said turbine to said propeller means, a propeller pitch control lever joined to said propeller means, and an exhaust gas control lever joined to said valve control means, the improvement comprising means for operating said exhaust gas control lever by movement of said propeller pitch control lever when said latter is moved to increase propeller pitch for actuating said valve control means to stop the flow of exhaust gas to said rotor means and to discharge it into the atmosphere.

2. In an aircraft as in claim 1, said propeller pitch control lever and said exhaust gas control lever being mounted in parallel planes and swingable parallel to each other, and said means for operating said exhaust gas control lever comprising an arm secured to said propeller pitch control lever and engageable with said exhaust gas control lever for pushing the latter.

References Cited
UNITED STATES PATENTS

| | | | |
|---|---|---|---|
| 666,875 | 1/1901 | Reeves | 74—480 |
| 2,292,091 | 8/1942 | Rhodes | 74—480 X |
| 2,653,778 | 9/1953 | Bennett et al. | 244—6 |

JULIUS E. WEST, *Primary Examiner.*